United States Patent
Nasuno

(10) Patent No.: US 12,273,068 B2
(45) Date of Patent: Apr. 8, 2025

(54) ABNORMALITY DETERMINATION SYSTEM AND POWER GENERATION SYSTEM

(71) Applicant: KANEKA CORPORATION, Osaka (JP)

(72) Inventor: Yoshiyuki Nasuno, Osaka (JP)

(73) Assignee: KANEKA CORPORATION, Osaka (JP)

(*) Notice: Subject to any disclaimer, the term of this patent is extended or adjusted under 35 U.S.C. 154(b) by 250 days.

(21) Appl. No.: 18/001,826

(22) PCT Filed: May 21, 2021

(86) PCT No.: PCT/JP2021/019332
§ 371 (c)(1),
(2) Date: Dec. 14, 2022

(87) PCT Pub. No.: WO2021/256170
PCT Pub. Date: Dec. 23, 2021

(65) Prior Publication Data
US 2023/0231517 A1     Jul. 20, 2023

(30) Foreign Application Priority Data
Jun. 18, 2020   (JP) .................... 2020-105475

(51) Int. Cl.
H02S 50/10   (2014.01)
H02S 50/00   (2014.01)

(52) U.S. Cl.
CPC .......... H02S 50/10 (2014.12); *H02J 2300/22* (2020.01); *H02S 50/00* (2013.01); *Y02B 10/10* (2013.01); *Y02E 10/50* (2013.01)

(58) Field of Classification Search
CPC ...... H02J 2300/22; H02S 50/00; H02S 50/10; Y02B 10/10; Y02E 10/50
See application file for complete search history.

(56) References Cited

U.S. PATENT DOCUMENTS

| | | | |
|---|---|---|---|
| 2011/0017270 A1* | 1/2011 | Chen | F24S 23/30 136/246 |
| 2013/0085729 A1 | 4/2013 | Tsuruta et al. | |
| 2020/0026982 A1* | 1/2020 | Clark | G06N 3/084 |

FOREIGN PATENT DOCUMENTS

| | | |
|---|---|---|
| JP | 2011216811 A | 10/2011 |
| JP | 2012055090 A | 3/2012 |

(Continued)

OTHER PUBLICATIONS

International Bureau of WIPO, International Preliminary Report on Patentability and Written Opinion of the International Searching Authority Issued in Application No. PCT/JP2021/019332, Dec. 13, 2022, WIPO, 7 pages.

*Primary Examiner* — Neel D Shah
*Assistant Examiner* — Adam S Clarke
(74) *Attorney, Agent, or Firm* — Alleman Hall & Tuttle LLP

(57) ABSTRACT

An abnormality determination system includes a power generation amount measurement unit that measures a power generation amount of the photovoltaic facility; a data acquisition unit that acquires data of a solar radiation amount; a calculation unit that divides a summed value of the power generation amount per day by a summed value of the solar radiation amount per day to calculates a division value; and a data accumulation unit that accumulates a combination of the power generation amount and the solar radiation amount, or the division value, and is configured to determine that there is an abnormality based on a slope of the division values.

15 Claims, 9 Drawing Sheets

(56) References Cited

FOREIGN PATENT DOCUMENTS

| | | | |
|---|---|---|---|
| JP | 2012205078 | A | 10/2012 |
| JP | 2013073537 | A | 4/2013 |
| JP | 2014216507 | A | 11/2014 |
| JP | 2015102882 | A | 6/2015 |
| JP | 2017028917 | A | 2/2017 |
| JP | 2017184355 | A | 10/2017 |
| JP | 2018170853 | A | 11/2018 |
| JP | 2019004529 | A | 1/2019 |
| KR | 20200059704 | A | 5/2020 |
| WO | 2016166991 | A1 | 10/2016 |

* cited by examiner

FIG. 3A SUNDAY POWER GENERATION AMOUNT(kWh)

FIG. 3B MONDAY POWER GENERATION AMOUNT(kWh)

FIG. 3C TUESDAY POWER GENERATION AMOUNT(kWh)

FIG. 3D WEDNESDAY POWER GENERATION AMOUNT(kWh)

FIG. 3E THURSDAY POWER GENERATION AMOUNT(kWh)

FIG. 3F FRIDAY POWER GENERATION AMOUNT(kWh)

FIG. 3G SATURDAY POWER GENERATION AMOUNT(kWh)

FIG. 3H MAXIMUM VALUE IN ONE WEEK POWER GENERATION AMOUNT(kWh)

ABNORMALITY DETERMINATION SYSTEM AND POWER GENERATION SYSTEM

TECHNICAL FIELD

The present invention relates to an abnormality determination system that determines an abnormality of a photovoltaic facility and a power generation system including the abnormality determination system.

BACKGROUND ART

With the recent spread of photovoltaic facilities, fire cases due to failures of photovoltaic facilities occur, although they are rare.

A photovoltaic facility for home use is often installed on a house roof, and a fire alarm is usually installed in a room of a house. However, a conventional fire alarm has a problem that a fire of a photovoltaic facility installed on a house roof cannot be promptly detected.

Therefore, in Patent Document 1, a fire notification line is provided on a solar cell panel so that a signal is transmitted from the fire notification line to a fire notification device when the temperature of the solar cell panel becomes equal to or higher than a certain temperature. Such a solar power generation system that detects abnormal heat generation and a fire of the solar cell panel is proposed.

PRIOR ART DOCUMENT

Patent Document

Patent Document 1: JP 2017-184355 A

DISCLOSURE OF INVENTION

Technical Problem

However, in the solar power generation system of Patent Document 1, an abnormality cannot be detected before abnormal heat generation or a fire occurrence in the solar cell panel. Therefore, there is a problem that it takes at least one month, usually several months, from the occurrence to the discovery of an abnormality of the solar cell panel.

Therefore, an object of the present invention is to provide an abnormality determination system and a power generation system capable of determining an abnormality of a photovoltaic facility earlier than conventional systems.

Solution to Problem

In view of the above problems, the inventor has studied past fire cases of modules, connectors, and the like, and has found a certain law between a power generation amount per kW of a system capacity per day and an inclined-plane solar radiation amount at the place. In other words, as a result of plotting a transition of the power generation amount per kW of the system capacity per day divided by the inclined-plane solar radiation amount per day (hereinafter, also referred to as a division value), it has been found that the value gradually decreases over time starting two months before a fire occurred as illustrated in the graph of FIG. 8A, although there are singular points (outliers) and variation. In other words, a significant decrease in the division value occurs as a precursor before the fire occurred as in FIG. 8A.

One aspect of the present invention derived as a result of intensive studies based on the above findings is an abnormality determination system that is configured to be connected to a photovoltaic facility to determine an abnormality thereof, including a power generation amount measurement unit that measures a power generation amount of the photovoltaic facility; a data acquisition unit that acquires data of a solar radiation amount; a calculation unit that divides a first summed value by a second summed value to calculate a division value, the first summed value referring to an summed value of the power generation amount per day measured by the power generation amount measurement unit, the second summed value referring to an summed value of the solar radiation amount per day acquired by the data acquisition unit; and a data accumulation unit that accumulates a combination of the measured power generation amount and data of the solar radiation amount, or accumulates the division value, wherein the abnormality determination system determines that there is an abnormality in any of following cases (1) to (3): (1) a case where an average value of the division values for a reference period is calculated in advance from the division values calculated in past, and a slope of the division values with respect to the average value of the division values for the reference period falls below a threshold value; (2) a case where an average value of the division values for the reference period is calculated by the calculation unit, and a slope of the division values with respect to the average value of the division values for the reference period falls below a threshold value; and (3) a case where a slope of a regression line of the division values for a determination period falls below a threshold value.

The "regression line" mentioned herein is a straight line representing a central distribution tendency of one set of data, and refers to a straight line calculated by a least squares method.

According to this aspect, a sign of an abnormality can be detected by a change in the slope of the division values, and the abnormality can be determined before the occurrence of abnormal heat generation or a fire, so that the abnormality of the photovoltaic facility can be determined earlier, compared to the prior art.

In a preferred aspect, the abnormality determination system determines that there is an abnormality when the slope of the division values with respect to the average value of the division values for the reference period falls below a threshold value continuously or intermittently a plurality of times.

According to this aspect, since the determination of an abnormality is made on condition that the slope falls below the threshold value a plurality of times, it is possible to suppress an erroneous determination of an abnormality even though there is a singular point.

Here, the present inventor has further studied the graph of FIG. 8A, and has considered that, as illustrated in the graph of FIG. 8B, by taking a moving average for one week for each division value and detecting a change in the slope of the division values, variation in the division values is further alleviated, and an abnormality can be found more accurately.

In a preferred aspect derived from this consideration, the calculation unit calculates an average value of the division values for the determination period, and the abnormality determination system determines that there is an abnormality when a slope of an average value of the division values for the determination period with respect to the average value of the division values for the reference period falls below a threshold value.

According to this aspect, since the moving average of the division values for the determination period including the present time is taken, even though there is a singular point in the division values within the determination period, the singular point is smoothed, and an abnormality can be determined more accurately.

In a preferred aspect, the data of the solar radiation amount includes an inclined-plane solar radiation amount.

According to this aspect, the determination can be made more accurately.

In a preferred aspect, the measured power generation amount per day is a power generation amount per 1 kW of a system capacity, and an absolute value of the threshold value is larger than an absolute value of a slope caused by aged deterioration of the photovoltaic facility calculated according to IEC 60904-3.

In a more preferred aspect, the absolute value of the threshold value is 0.005 $m^2/kW \cdot day$ or more.

According to these aspects, an erroneous determination of failure can be further suppressed.

In a preferred aspect, the abnormality determination system including notification means that issues a notification that an abnormality has occurred when the abnormality determination system has determined that there is an abnormality.

According to this aspect, since the occurrence of the abnormality is notified, a user or the like easily notices the abnormality.

In a preferred aspect, the photovoltaic facility includes a photovoltaic device and a power conditioner that inverts power generated by the photovoltaic device into AC power having a predetermined frequency, the abnormality determination system includes an error detection unit that detects error information of the power conditioner, and an abnormality is determined using the error information.

According to this aspect, since the abnormality is determined using the error information of the power conditioner, the abnormality can be determined more accurately.

In a more preferred aspect, the error information is classified into first error information related to a power generation amount and second error information not related to a power generation amount, and the threshold value is increased on condition that the error information is the first error information.

According to this aspect, since the threshold value for determining the abnormality is lowered on condition that the error information in the power conditioner is the first error information related to a power generation amount, the abnormality can be determined more quickly.

In a more preferred aspect, the abnormality determination system including an arc information acquisition unit that acquires arc information related to an arc discharge in the photovoltaic device or between the photovoltaic device and the power conditioner, wherein an abnormality is determined using the arc information.

According to this aspect, since the abnormality is determined using the arc information, the abnormality can be determined more quickly.

Incidentally, an actual power generation amount of a photovoltaic device is usually affected by external factors such as a shadow of a building. In other words, there is a gap between a summed theoretical power generation amount per week predicted from an actual measurement value of a solar radiation amount that can be acquired from the Japan Meteorological Agency or the like and a summed actual power generation amount per week that is actually measured. Even though the actual power generation amount is monitored, the variation of the actual power generation amount is large, and it is difficult to determine whether the variation of the actual power generation amount is due to the solar radiation amount or due to an abnormality.

In addition, data of the solar radiation amount and the actual power generation amount are measured a plurality of times in one day, and a value in a time zone measured varies depending on the day.

Therefore, the present inventor has compared the actual power generation amounts in the same time zone in each day of a week, and focused on a maximum power generation amount for each time zone in each day of the week. In other words, since a theoretical power generation amount is a power generation amount from which all external factors are excluded, and the maximum power generation amount is a maximum power generation amount with an extremely small influence of the external factors, it has been considered that the theoretical power generation amount and the maximum power generation amount in each time zone shows close values.

Then, based on this idea, the present inventor has compared a ratio A to a ratio B. Here, the ratio A is a ratio of the summed actual power generation amount per week with respect to the summed theoretical power generation amount per week. And ratio B is a ratio of a summed actual power generation amount for one day to which a maximum actual power generation amount in each time zone of each day of the week is extracted with respect to a summed theoretical power generation amount for one day to which a maximum theoretical power generation amount in each time zone of each day of the week is extracted. As a result, the present inventor has found that, as illustrated in FIG. 9, the ratio B takes a value closer to 100% than the ratio A, and variation from a theoretical value can be suppressed.

In response to this finding, the present inventor has considered that since a summed value for one day of the maximum actual power generation amount in each time zone of each day of the week generally takes a value close to a summed value for one day of the maximum theoretical power generation amount in each time zone of each day of the week, the influence of the external factors can be reduced by monitoring the summed value for one day of the maximum actual power generation amount in each time zone, and the variation due to an abnormality can be extracted.

One aspect of the present invention derived from the above consideration is an abnormality determination system that is configured to be connected to a photovoltaic facility to determine an abnormality thereof, including a power generation amount measurement unit that measures a power generation amount of the photovoltaic facility; a calculation unit that creates summed power generation amount data for one day in a predetermined period; and a data accumulation unit that accumulates a combination of the power generation amount measured by the power generation amount measurement unit and time at which the measurement is made, or the summed power generation amount data for one day, wherein the summed power generation amount data for one day is created by dividing one day into time zones having a predetermined time interval and extracting a maximum power generation amount of each time zone in the predetermined period to add up the extracted maximum power generation amounts, and the abnormality determination system determines that there is an abnormality when a slope of the summed power generation amount data for one day falls below a threshold value.

According to this aspect, since a maximum power generation amount per kW in each time zone in the predetermined period is extracted, and an abnormality is determined using the variation in the slope of the summed power generation amount data for one day of the maximum power generation amount in each time zone, the abnormality can be determined more accurately.

According to this aspect, since an abnormality is determined by a slope of unit power generation amount data for a determination period, the abnormality can be determined even though there is a singular point.

One aspect of the present invention is an abnormality determination system that is configured to be connected to a photovoltaic facility to determine an abnormality thereof, including a power generation amount measurement unit that measures a power generation amount of the photovoltaic facility; a data acquisition unit that acquires data of a solar radiation amount; a calculation unit that creates summed power generation amount data for one day and summed solar radiation amount data for one day in a predetermined period; and a data accumulation unit that accumulates: a combination of the power generation amount measured by the power generation amount measurement unit, time at which the measurement is made, and data of the solar radiation amount; or the summed power generation amount data for one day and the summed solar radiation amount data for one day, wherein the summed power generation amount data for one day is created by dividing one day into time zones having a predetermined time interval and extracting a maximum power generation amount of each time zone in the predetermined period to add up the extracted maximum power generation amounts, wherein the solar radiation amount data for one day is created by dividing one day into time zones having a predetermined time interval and extracting a maximum solar radiation amount in each time zone in the predetermined period to add up the extracted maximum solar radiation amounts, and wherein the abnormality determination system determines that there is an abnormality when a slope of division values falls below a threshold value, the division values being obtained by dividing the summed power generation amount data for one day by comparison summed power generation amount data for one day, the comparison summed power generation amount data for one day being calculated using the solar radiation amount data for one day.

According to this aspect, since it is not necessary to use weather conditions such as a cloudy day and a rainy day for determination, an error can be further suppressed even though a measurement point of the solar radiation amount and an installation place of a power generation facility are away from each other.

One aspect of the present invention is a power generation system including the above abnormality determination system and the photovoltaic facility.

According to this aspect, it is possible to determine an abnormality of the photovoltaic facility more accurately and earlier than before.

Effect of Invention

According to the abnormality determination system and the power generation system of the present invention, it is possible to determine an abnormality of the photovoltaic facility earlier than conventional systems.

BRIEF DESCRIPTION OF DRAWINGS

FIGS. 3A to 3H are explanatory diagrams when a maximum power generation amount is extracted in a power generation system according to a third embodiment of the present invention, wherein FIGS. 3A to 3G are histograms of a power generation amount in each day of the week, and FIG. 3H is a histogram obtained by extracting a maximum power generation amount in each time of one week. The hatching indicates the maximum power generation amounts when the power generation amounts in each day of the week are compared.

FIGS. 5A to 5H are explanatory diagrams when a maximum solar radiation amount is extracted in a power generation system according to a fifth embodiment of the present invention, wherein FIGS. 5A to 5G are histograms of a solar radiation amount in each day of the week, and FIG. 5H is a histogram obtained by extracting a maximum solar radiation amount in each time of one week. The hatching indicates the maximum solar radiation amounts when the solar radiation amounts in each day of the week are compared.

FIGS. 8A and 8B are graphs used by the present inventor for consideration, wherein FIG. 8A is a graph of a division value with respect to a date, and FIG. 8B is a graph of a weekly moving average of the division value with respect to the date.

BEST MODE FOR CARRYING OUT THE INVENTION

Hereinafter, embodiments of the present invention will be described in detail. Note that, hereinafter, the term "average" refers to an arithmetic mean unless otherwise noted.

Figure 1:
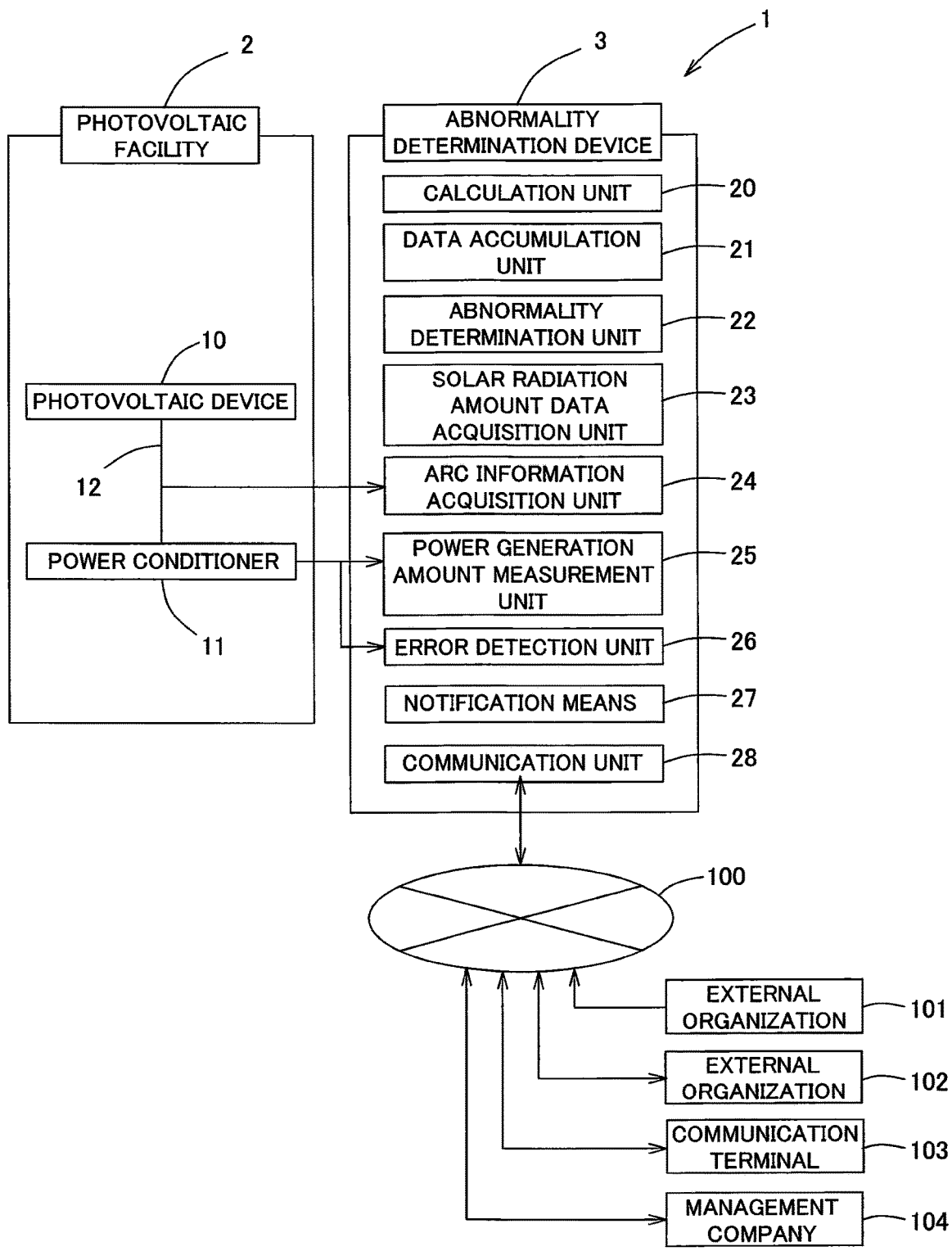
FIG. 1 is a block diagram schematically illustrating a power generation system according to a first embodiment of the present invention.

As illustrated in FIG. 1, a power generation system 1 according to a first embodiment of the present invention includes a photovoltaic facility 2 and an abnormality determination device 3 (an abnormality determination system), and can perform one-way communication or mutual communication with external organizations 101 and 102, a communication terminal 103, and a management company 104 via a network 100 such as an intranet or the internet.

As illustrated in FIG. 1, the photovoltaic facility 2 includes a photovoltaic device 10, a power conditioner 11, and a connection wiring line 12 as main components.

The photovoltaic device 10 is provided with a photoelectric conversion device that converts light energy into electric energy, and specifically, includes a solar cell that extracts DC power from sunlight.

The power conditioner 11 is a power conversion device that converts DC power or AC power into AC power with a predetermined frequency.

The connection wiring line 12 is a wiring line that connects the photovoltaic device 10 to the power conditioner 11, and is an extraction wiring line that extracts DC power from a photovoltaic device 10 side to a power conditioner 11 side.

The abnormality determination device 3 includes a computer including a central processing unit having an arithmetic logic unit that performs an operation on data and a control unit that controls each unit, a storage unit that stores a program and data, an input unit that receives data from the outside, an output unit that outputs data to the outside, and the like in the device.

As illustrated in FIG. 1, the abnormality determination device 3 includes a calculation unit 20, a data accumulation unit 21, an abnormality determination unit 22, a solar radiation amount data acquisition unit 23, an arc information acquisition unit 24, a power generation amount measurement unit 25, an error detection unit 26, notification means 27, and a communication unit 28 as main components.

The calculation unit 20 is a part that performs calculation such as calculation of a division value to be described later according to various programs.

The data accumulation unit 21 is a part that accumulates data such as a power generation amount, information regarding the power generation amount, and time. The data accumulation unit 21 of the present embodiment can accumulate a combination of a power generation amount per kW of a system capacity measured by the power generation amount measurement unit 25 and data of a solar radiation amount acquired by the solar radiation amount data acquisition unit 23 or data of a division value.

The abnormality determination unit 22 is a part that compares the division value with a threshold value and determines an abnormality.

The solar radiation amount data acquisition unit 23 is a part that acquires the data of the solar radiation amount of the external organization 101 from the communication unit 28 via the network 100.

The arc information acquisition unit 24 is a part that is connected to the connection wiring line 12 connecting the photovoltaic device 10 to the power conditioner 11 to constantly acquire information on an arc discharge of the photovoltaic device 10. The arc information acquisition unit 24 can detect a DC arc discharge caused by a disconnection of a cable, a contact failure of a connector, or the like by using a waveform of a current passing through the connection wiring line 12 connected to a DC power side of the power conditioner 11.

The power generation amount measurement unit 25 is a part that constantly monitors and measures the power generation amount generated by the photovoltaic device 10 via the power conditioner 11.

The error detection unit 26 is a part that constantly monitors the presence or absence of error information of the power conditioner 11.

The notification means 27 is a notification device that notifies a user, the management company 104, and the like that the abnormality determination unit 22 has determined that there is an abnormality when the abnormality determination unit 22 has determined that there is an abnormality.

A notification method of the notification means 27 is not particularly limited, and for example, the notification can be performed by sound, color, video, language, or the like.

The notification means 27 of the present embodiment can perform a notification or reporting to the communication terminal 103 of the user, the management company 104, and the like from the communication unit 28 via the network 100.

The communication unit 28 can communicate with the external organizations 101 and 102, the communication terminal 103, the management company 104, and the like via the network 100.

The external organizations 101 and 102 are organizations that publicize information regarding a solar radiation amount such as a global solar radiation amount in each area.

The communication terminal 103 is a terminal that enables one-way communication or mutual communication via the network 100. Examples of the communication terminal 103 include a fixed terminal such as a computer, and a portable terminal such as a mobile phone, a smartphone, and a tablet.

Next, a recommended operation how the abnormality determination unit 22 determines an abnormality (hereinafter, also referred to as an abnormality determination operation) in the power generation system 1 of the present embodiment will be described with reference to the flowchart of FIG. 2.

To start with, a counter i is set to 0 (step S1), and a timer is reset to an initial state (step S2). Then, the timer is turned on (step S3), the power generation amount measurement unit 25 constantly measures the power generation amount, and power generation amount data per kW of the system capacity per day is calculated by using a summed value of the power generation amount per day. In addition, the solar radiation amount data acquisition unit 23 acquires the data of the solar radiation amount per day in an installation area on the same day from the external organization 101.

Then, at least a combination of the following data (1) and (2) or the following data (3) is accumulated in the data accumulation unit 21:

(1) power generation amount data per day;
(2) the power generation amount data per kW of the system capacity per day; and
(3) a solar radiation amount per day, and a division value obtained by dividing the power generation amount data per kW of the system capacity per day by the solar radiation amount data per day (hereinafter, simply referred to as the division value).

Specifically, the division value is calculated by the following formula (1).

[Mathematical formula 1]

$$\text{Division value} = \frac{\text{power generation amount per day (kWh)}}{\text{inclined-plane solar radiation amount}} \quad \text{Formula (1)}$$
$$\text{per day } (kWh/m^2) \cdot \text{system capacity (kW)}$$

Here, an inclined-plane solar radiation amount can be calculated by the following formula (2).

[Mathematical formula 2]

Inclined-plane solar radiation amount=global solar radiation amount($kWh/m^2$)×correction coefficient    Formula (2)

The global solar radiation amount refers to a solar radiation amount from the sun reaching a horizontal plane on the ground from the whole sky, and a value published by the external organization 101 related to the weather such as the Japan Meteorological Agency can be used.

The correction coefficient can be calculated for each day by correcting an angle in the installation area based on the data publicized by the external organization 102 such as the NEDO (for example, a database of annual monthly solar radiation amounts of the New Energy and Industrial Technology Development Organization (NEDO) (MONSOLA-11).

Specifically, the correction coefficient can be calculated by dividing the solar radiation amount in consideration of an azimuth angle and an inclination angle in the installation area by the global solar radiation amount.

Furthermore, while the error detection unit 26 determines whether there is error information in the power conditioner 11 (step S4), the presence or absence of the arc discharge is detected by arc information acquired by the arc information acquisition unit 24 (step S5).

Here, the error information is information that an error has occurred in the power conditioner 11, and the error information of the present embodiment includes first error information related to a power generation amount such as a current value abnormality and second error information not related to a power generation amount such as a command abnormality. In other words, the first error information is information related to a defect leading to a fire or the like on a one-to-one correspondence basis, and the second error information is information not related to a defect leading to a fire or the like on a one-to-one correspondence basis.

The arc information is information related to the arc discharge, and corresponds to the arc discharge on a one-to-one correspondence basis.

When a determination period T1 elapses (Yes in step S6) in a state where the error information or the arc discharge does not occur after the timer is turned on (Yes in both step S4 and step S5), the calculation unit 20 calculates the division value from the power generation amount and the solar radiation amount on the day. In addition, the calculation unit 20 uses an average value of the division values for a past reference period T2 to calculate a slope of the division values for the determination period T1 with respect to the average value of the division values for the past reference period T2.

Here, the determination period T1 is preferably one day or more and two weeks or less, and more preferably one day or more and five days or less.

The reference period T2 is preferably 20 days or more and two years or less, and more preferably one month or more and one year or less.

In the present embodiment, the determination period T1 is one day, and the reference period T2 is the latest month including the time of the elapse of the determination period T1. In other words, the reference period T2 of the present embodiment is a period that is twice or more the determination period T1.

When the slope of the division values at the time of the elapse of the determination period T1 with respect to the average value of the division values for the reference period T2 is less than the threshold value (Yes in step S7) and the counter i exceeds n (Yes in step S8), it is determined that there is an abnormality (step S9), and the notification means 27 notifies the communication terminal 103 of the user, the management company 104, and the like (step S10).

At this time, the threshold value is a negative value, and an absolute value is preferably a value larger than an absolute value of a slope due to aged deterioration of the photovoltaic facility 2 calculated according to International Electrotechnical Commission (IEC) 60904-3. In other words, the absolute value of the threshold value is preferably larger than a value of a nominal power reduction rate under the International Standard Test Conditions (STC).

The absolute value of the threshold value is preferably twice or more a slope of long-term reliability described in a specification of the photovoltaic device 10, and more preferably a value of 0.005 m²/kW·day or more.

Furthermore, n is a natural number of 2 or more, preferably 3 or more and 7 or less, and more preferably 4 or more and 6 or less.

On the other hand, when the slope of the division values at the time of the elapse of the determination period T1 with respect to the average value of the division values for the reference period T2 is equal to or more than the threshold value, that is, within a range of the threshold value (No in step S7), the process returns to step S2, the timer is reset, and the same operation is performed.

In addition, when the slope of the division values at the time of the elapse of the determination period T1 with respect to the average value of the division values for the reference period T2 is less than the threshold value, that is, exceeds the range of the threshold value (Yes in step S7) and the counter i is n or less (No in step S8), the counter i is set to i+1 (step S11), the process returns to step S2, the timer is reset, and the same operation is performed.

When there is error information in the power conditioner 11 in step S4 (No in step S4), the error information is classified into the first error information as information related to a power generation amount on a one-to-one correspondence basis and the second error information as information not related to a power generation amount on a one-to-one correspondence basis, and it is determined whether the error information is the first error information (step S12).

When the error information is the first error information (Yes in step S12), on/off of a flag is confirmed (step S13), and when the flag is off (Yes in step S13), the threshold value is changed (step S14), the flag is turned on (step S15), and the process returns to step S5.

Note that when the threshold value is changed in step S14, it is preferable to change the threshold value to ⅓ or more and ⅔ or less of the threshold value that is currently set. Within this range, it is possible to suppress an erroneous determination of an abnormality while detecting the abnormality early. In the present embodiment, when the threshold value is changed in step S14, the threshold value is changed to ½ of the threshold value that is currently set.

On the other hand, when the error information is the second error information and is not the first error information in step S12 (No in step S12) or when the flag is in an on state in step S13 (No in step S12), the process returns to step S5 without changing the threshold value.

Furthermore, when the arc discharge is detected in step S5 (No in step S5), the process proceeds to step S9 without determining the slope, and it is determined that there is an abnormality (step S9).

According to the power generation system 1 of the present embodiment, since it is possible to detect a sign of an abnormality by a change in the slope of the division values and to determine the abnormality before the occurrence of abnormal heat generation or a fire, it is possible to determine the abnormality of the photovoltaic facility 2 earlier than the occurrence of a fire or the like in the photovoltaic facility 2.

According to the power generation system 1 of the present embodiment, when the abnormality determination unit 22 determines the abnormality, the management company 104 is notified, so that a person in charge of facility management of the management company 104 can promptly go to the scene for investigation. In other words, according to the power generation system 1 of the present embodiment, it is possible to prompt a field investigation and allow an operator to check whether there is a damaged part or the like, and it is possible to prevent a large disaster such as a fire.

According to the power generation system 1 of the present embodiment, since it is determined that there is an abnormality when the division value continuously or intermittently falls below the threshold value a plurality of times, the erroneous determination can be suppressed, and an abnormality can be determined more accurately.

Next, a power generation system according to a second embodiment of the present invention will be described. Note that the same reference numerals are attached to the same components as those of the power generation system 1 of the first embodiment, and the description thereof will be omitted. The same applies hereinafter.

The power generation system of the second embodiment is different from the power generation system 1 of the first embodiment in the determination of the abnormality by the abnormality determination unit 22.

Figure 2:
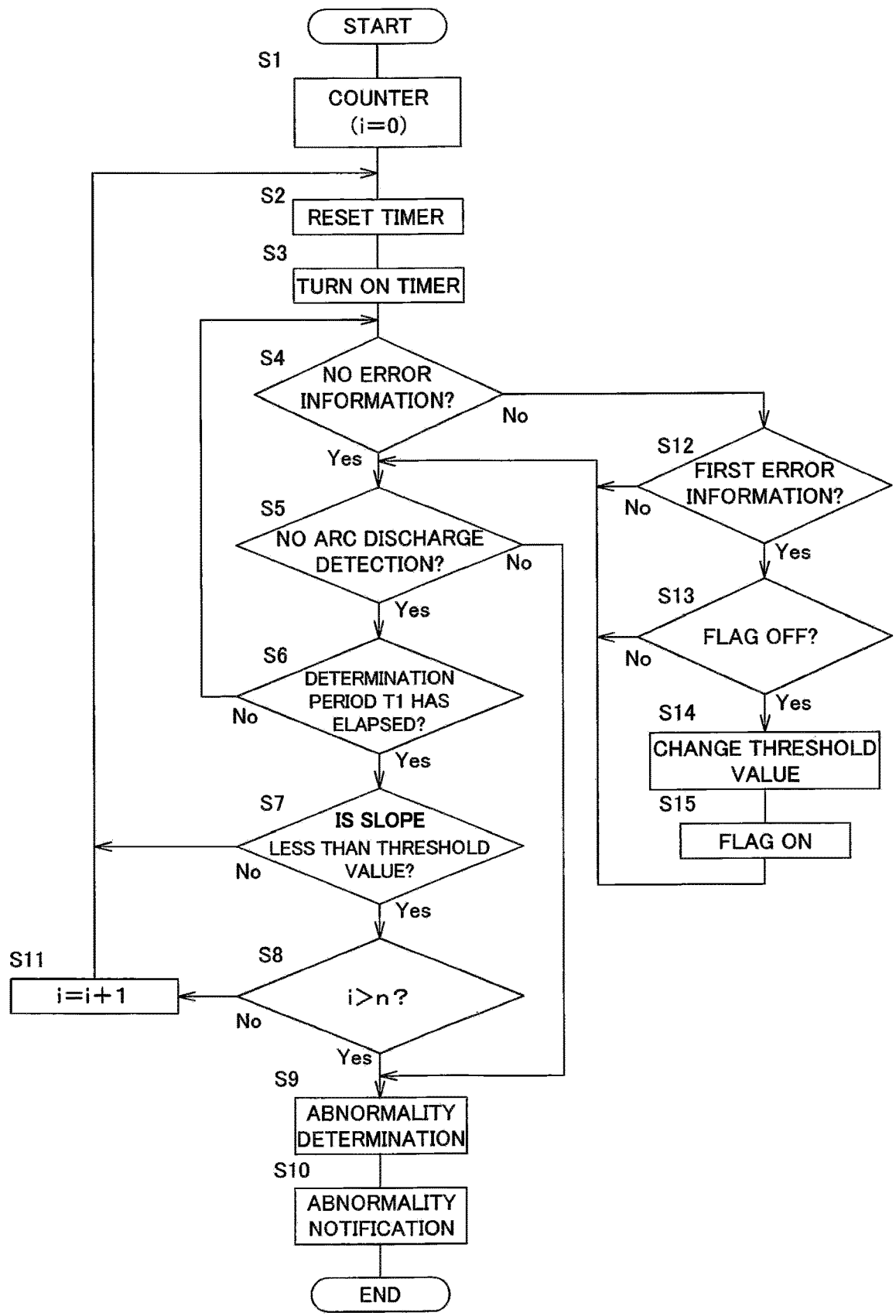
FIG. 2 is a flowchart when an abnormality is determined in the power generation system of FIG. 1.

Specifically, in the first embodiment, in step S7 of FIG. 2, the slope of the division values at the time of the elapse of the determination period T1 with respect to the average value of the division values for the reference period T2 is compared with the threshold value. On the other hand, in step S7, the power generation system of the second embodiment compares a slope of an average value of the division values for the determination period T1 with respect to the average value of the division values for the reference period T2 with the threshold value. In other words, in the power generation system of the second embodiment, a slope of a moving average of the division values at the time of the elapse of the determination period T1 for the determination period T1 is compared with the threshold value.

In other words, a p-term moving average is calculated, and a slope of the p-term moving average including the division values at the time of the elapse of the determination period T1 is compared with the threshold value.

Types of the moving average are not particularly limited, but is preferably a simple moving average.

A period of a section is preferably shorter than the determination period T1, and the number of sections p is preferably 3 or more and 10 or less.

According to the power generation system of the second embodiment, even though there is a singular point in the division values within the determination period T1, the singular point is leveled, so that an abnormality can be determined more accurately.

Next, a power generation system according to a third embodiment of the present invention will be described.

The power generation system of the third embodiment is different from the power generation system 1 of the first embodiment in the determination of the abnormality by the abnormality determination unit 22.

In the power generation system of the third embodiment, the power generation amount measurement unit 25 constantly monitors the power generation amount, and the calculation unit 20 creates summed power generation amount data for one day for each predetermined period T4.

Specifically, in the power generation system of the third embodiment, one day is divided into time zones by a predetermined time T3, and the calculation unit 20 compares the power generation amounts per kW in each time zone in the predetermined period T4, and extracts a maximum power generation amount per kW in each time zone. Then, the extracted maximum power generation amount is summed to calculate a summed power generation amount for one day, and this is accumulated in the data accumulation unit 21 as the summed power generation amount data for one day per predetermined period T4.

At this time, the predetermined time T3 is preferably a time that can equally divide 24 hours.

The predetermined time T3 is preferably more than 0 hours and less than 24 hours, and more preferably 0.5 hours or more and 3 hours or less.

Figure 3:
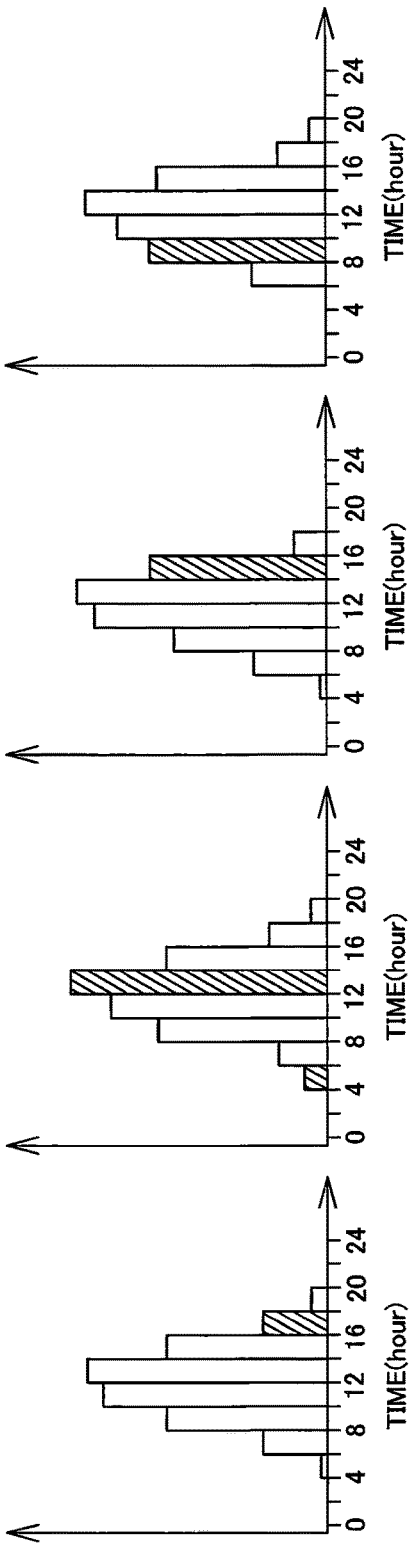

The predetermined time T3 of the present embodiment is two hours as illustrated in FIG. 3. Note that measurement of the power generation amount by the power generation amount measurement unit 25 may exclude the sunset time.

The predetermined period T4 is a period of two days or more, preferably three days or more and two weeks or less, and more preferably four days or more and ten days or less. The predetermined period T4 of the present embodiment is one week.

In other words, in the present embodiment, as illustrated in FIGS. 3A to 3G, one day is divided into time zones by two hours, the power generation amount for each time zone of each day of the week is calculated, the power generation amounts in each time zone for each day of the week are compared, and the maximum power generation amount in each time zone is extracted (see the hatching in FIGS. 3A to 3G). Then, as illustrated in FIG. 3H, the extracted maximum power generation amount in each time zone is summed to calculate the summed power generation amount for one day, and this is accumulated in the data accumulation unit 21 as the summed power generation amount data for one day per week.

Then, in step S7 of FIG. 2, when a slope of current summed power generation amount data for one day with respect to an average value of the summed power generation amount data for one day for the determination period T1 including the present time falls below the threshold value (Yes in step S7) and the counter i exceeds n (Yes in step S8), it is determined that there is an abnormality (step S9).

At this time, the determination period T1 of the present embodiment is a period longer than the predetermined period T4, and is preferably a period twice or more the predetermined period T4.

Moreover, the time of the elapse of the determination period T1 preferably coincides with the time the elapse of the predetermined period T4.

According to the power generation system of the third embodiment, the maximum power generation amount per kW in each time zone for the predetermined period T4 is extracted, the summed value of the extracted maximum power generation amount in each time zone is set as the summed power generation amount data for one day, and an abnormality is determined by the slope of the summed power generation amount data for one day for the determination period T1. Therefore, the abnormality determination unit 22 can determine an abnormality without using the data of the solar radiation amount.

Next, a power generation system according to a fourth embodiment will be described.

In the power generation system of the fourth embodiment, a base point of the slope of the division values is not set to the average value of the division values for the past reference period T2, but is set to a division value satisfying certain conditions.

Figure 4:
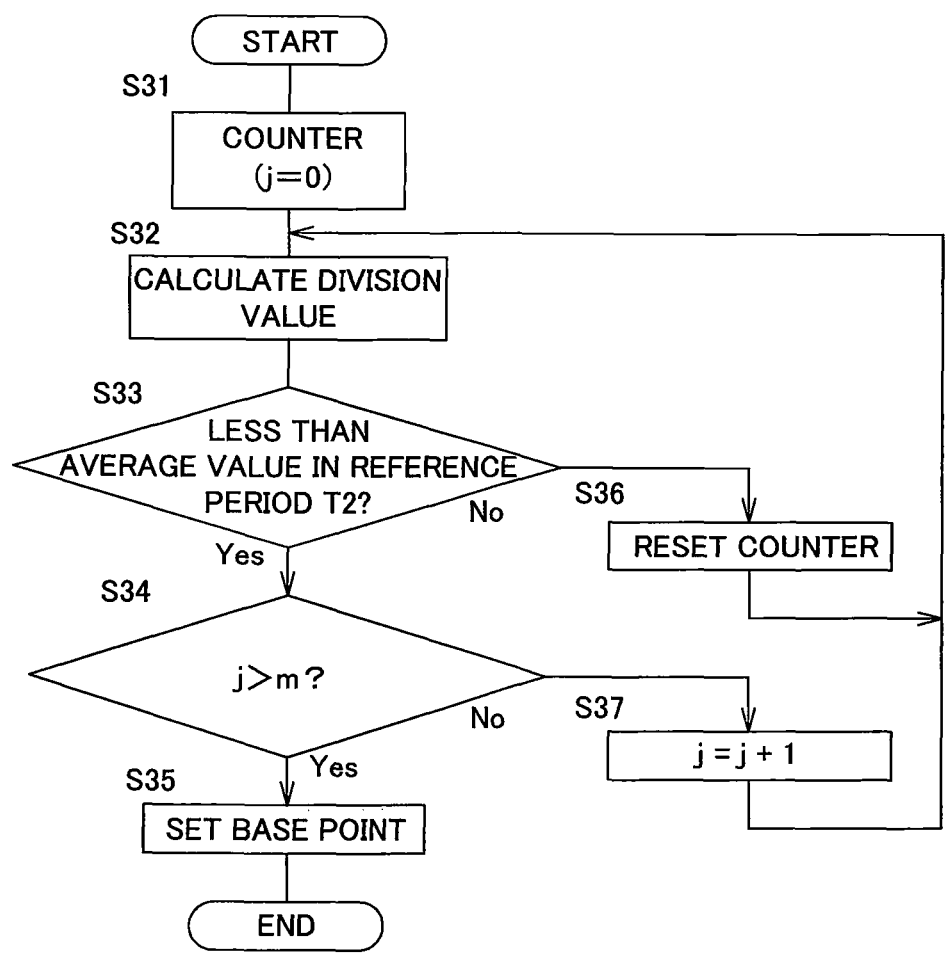
FIG. 4 is a flowchart when a base point is set in a power generation system according to a fourth embodiment of the present invention.
Figure 5:
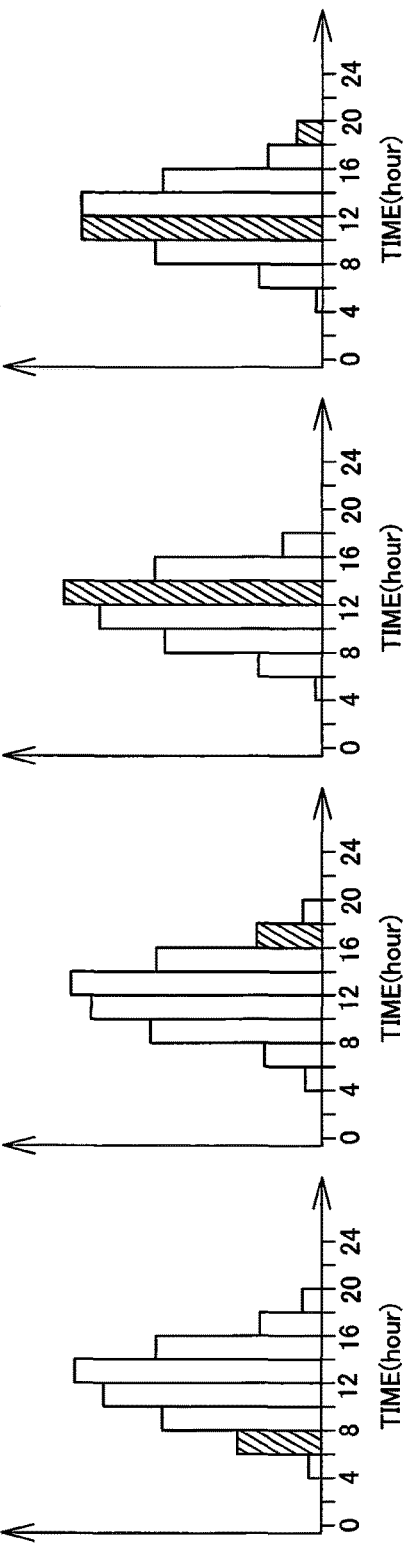

Specifically, the power generation amount data per day is calculated, and the base point is determined every time the division value is calculated. As illustrated in the flowchart of FIG. 4, to start with, a counter j is set to 0 (step S31), and when the division value is calculated (step S32), it is determined whether the division value is less than the average value for the past reference period T2 (step S33).

When the division value is less than the average value for the past reference period T2 (Yes in step S33), the process proceeds to step S34, and it is determined whether the counter j exceeds m.

When the counter j exceeds m (Yes in step S34), the current division value is set as the base point (step S35).

At this time, m is a natural number of 2 or more, preferably 3 or more and 7 or less, and more preferably 4 or more and 6 or less.

On the other hand, when the division value is equal to or more than the average value for the past reference period T2 (No in step S33), the counter j is reset (step S36), and the process proceeds to step S32.

When the counter j is m or less in step S34 (No in step S34), the counter j is set to j+1 (step S37), and the process proceeds to step S32.

Then, in the power generation system of the present embodiment, when the base point is set, the process proceeds to step S1 of FIG. 2, and the slope with respect to the base point is compared with the threshold value in step S7.

According to the power generation system of the fourth embodiment, since the actual division value is used as the base point of the slope, an abnormality can be detected more accurately.

Next, a power generation system according to a fifth embodiment of the present invention will be described.

In the power generation system of the fifth embodiment, similarly to the power generation system of the third embodiment, the power generation amount measurement unit 25 constantly measures a power generation amount, and the solar radiation amount data acquisition unit 23 acquires a solar radiation amount for a predetermined time or continuously. Then, in the power generation system of the fifth embodiment, the calculation unit 20 creates summed power generation amount data for one day and summed solar radiation amount data for one day within the predetermined period T4.

Specifically, in the power generation system of the fifth embodiment, similarly to the power generation system of the third embodiment, one day is divided into time zones by the predetermined time T3, and the calculation unit 20 compares the power generation amount per kW in each time zone for the predetermined period T4 and extracts a maximum power generation amount per kW in each time zone. Then, the extracted maximum power generation amount is summed to calculate the summed power generation amount for one day, and this is accumulated in the data accumulation unit 21 as the summed power generation amount data for one day per predetermined period T4.

In the power generation system of the fifth embodiment, in addition to the above, as illustrated in FIGS. 5A to 5H, one day is divided into time zones by the predetermined time T3, the calculation unit 20 compares solar radiation amounts in each time zone for the predetermined period T4, and extracts a maximum solar radiation amount in each time zone. Then, the extracted maximum solar radiation amount is summed to calculate a summed solar radiation amount for one day, and this is accumulated in the data accumulation unit 21 as summed solar radiation amount data for one day per predetermined period T4.

Furthermore, the power generation system of the fifth embodiment calculates a comparison summed power generation amount from the summed solar radiation amount for one day, and accumulates the comparison summed power generation amount in the data accumulation unit 21 as comparison summed power generation amount data.

The comparison summed power generation amount is calculated by the following formula (3).

[Mathematical formula 3]

$$\text{Comparison summed power generation amount} = \frac{\text{summed solar radiation for one day } (kWh/m^2/day) \times \text{system capacity } (kW) \times \text{loss factor} \times 1(day)}{\text{summed solar radiation intensity in a normal state } (kW/m^2)}$$

Formula (3)

Note that the loss factor is a loss generated when the photovoltaic device 10 generates power, and can be obtained by, for example, multiplying a correction coefficient based on temperature defined in display guidelines set by the Japan Photovoltaic Energy Association (JPEA), conversion efficiency of the power conditioner 11, and other loss factors (hereinafter, the above method is referred to as a JPEA method for convenience).

Then, in step S7 of FIG. 2, when the slope of the division values obtained by dividing the summed power generation amount data for one day for the determination period T1 including the present time by the comparison power generation amount data for one day for the determination period T1 falls below the threshold value (Yes in step S7) and the counter i exceeds n (Yes in step S8), it is determined that there is an abnormality (step S9).

According to the power generation system of the fifth embodiment, since determination can be made without using weather conditions such as a cloudy day and a rainy day, it is possible to further suppress an error that occurs when the measurement point of the solar radiation amount and an installation place of the photovoltaic facility 2 are away from each other.

In the embodiments described above, the calculation unit 20 and the like are provided in the abnormality determination device 3, but the present invention is not limited thereto. The calculation unit 20 or the like may be provided in an external server 200 connected via the network 100 and used for calculation or the like. In this case, the power generation system according to the present invention also includes the network 100 and the external server 200.

Figure 6:
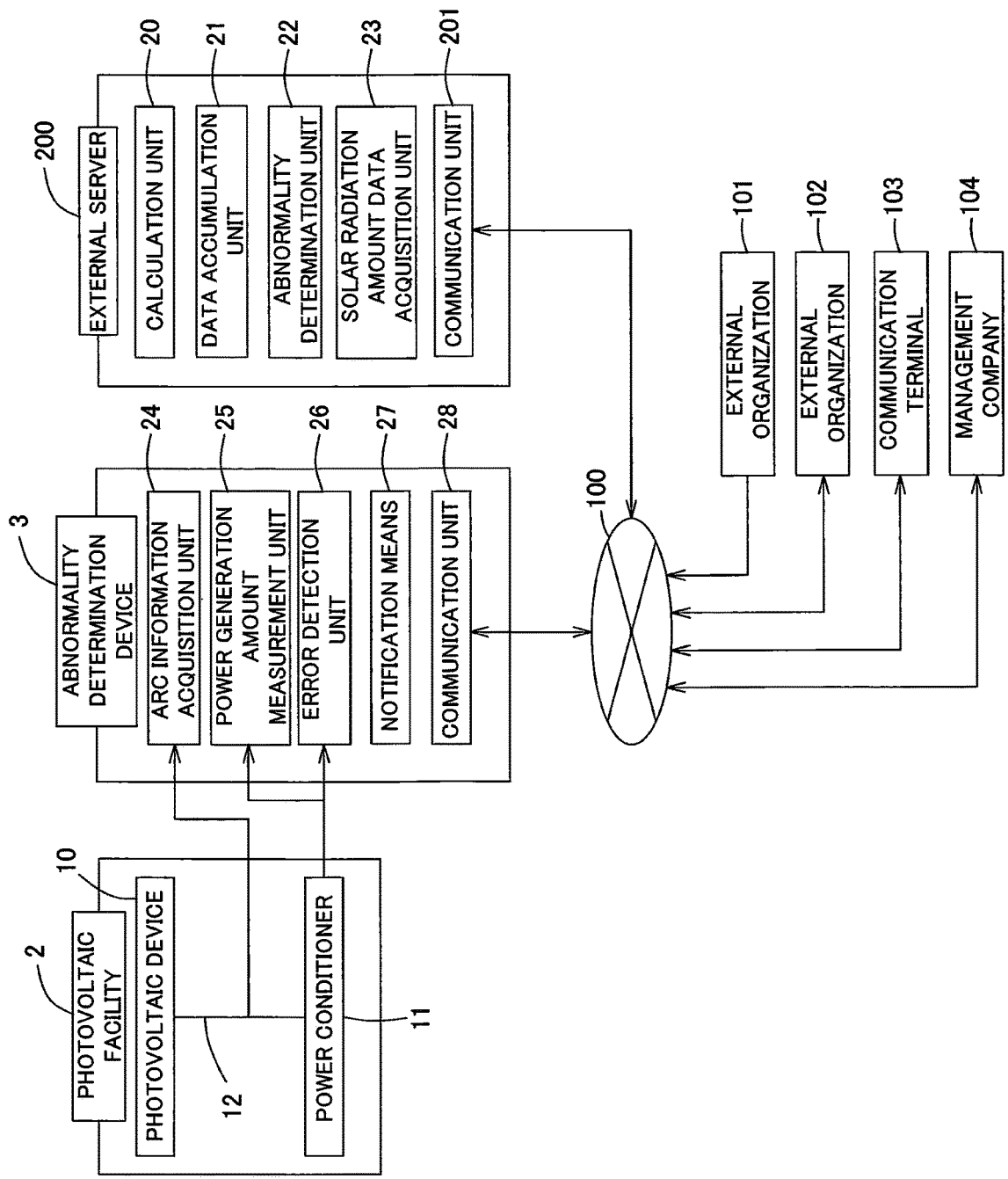
FIG. 6 is a block diagram schematically illustrating a power generation system according to another embodiment of the present invention.

For example, in the power generation system illustrated in FIG. 6, the abnormality determination device 3 is provided with the arc information acquisition unit 24, the power generation amount measurement unit 25, the error detection unit 26, the notification means 27, and the communication unit 28, and the external server 200 is provided with the calculation unit 20, the data accumulation unit 21, the abnormality determination unit 22, the solar radiation amount data acquisition unit 23, and a communication unit 201. In this case, the communication unit 28 of the abnormality determination device 3 and the communication unit 201 of the external server 200 can communicate with each other via the network 100.

Figure 7:
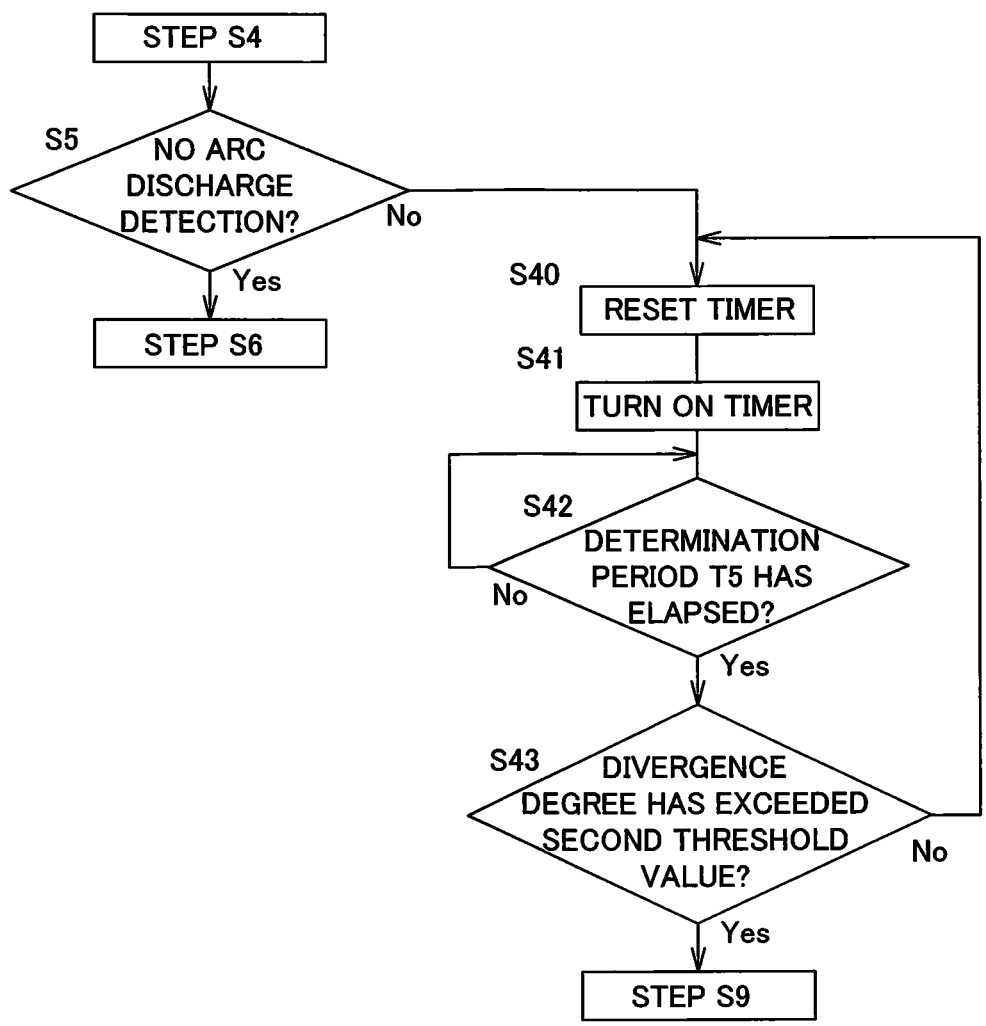
FIG. 7 is a flowchart when an abnormality is determined in a power generation system according to another embodiment of the present invention.
Figure 8A:
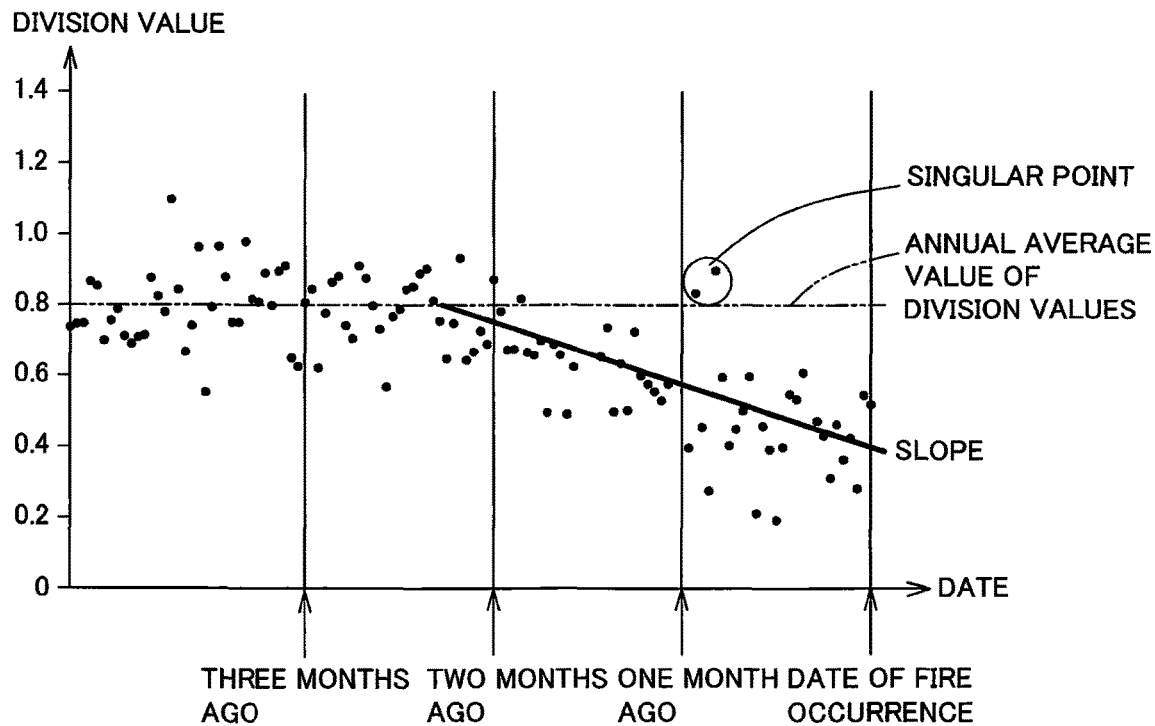
Figure 8B:
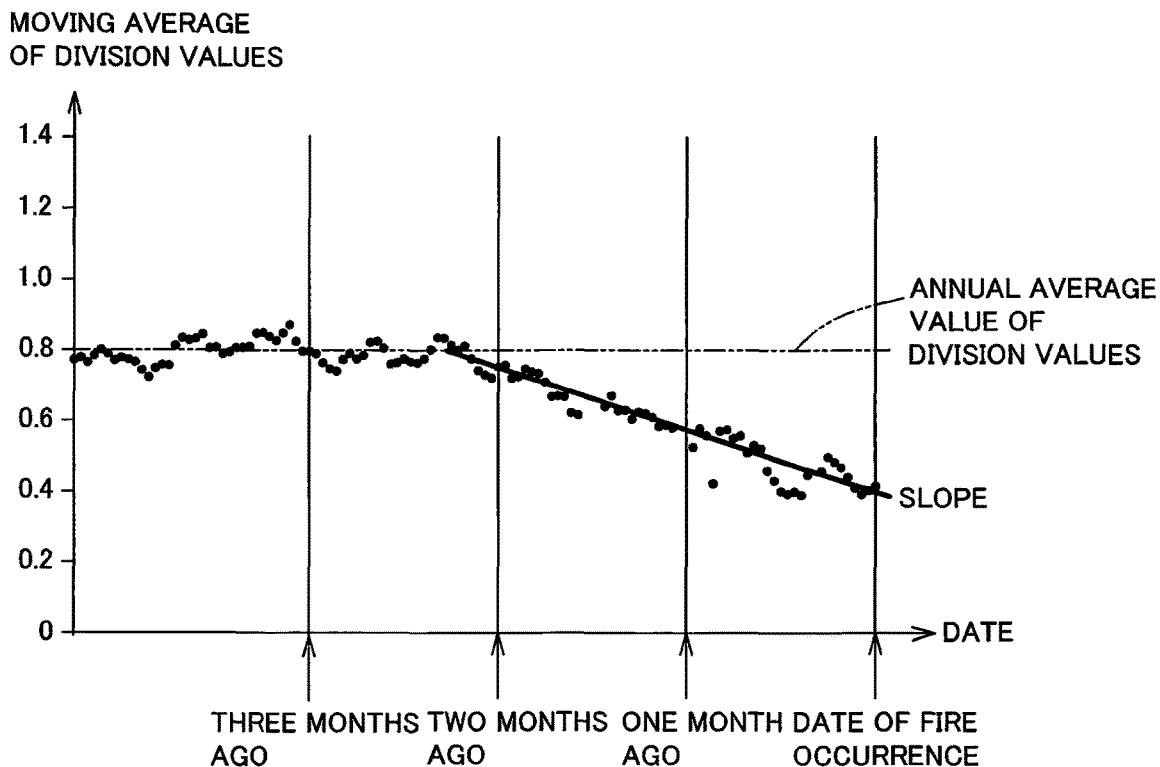
Figure 9:
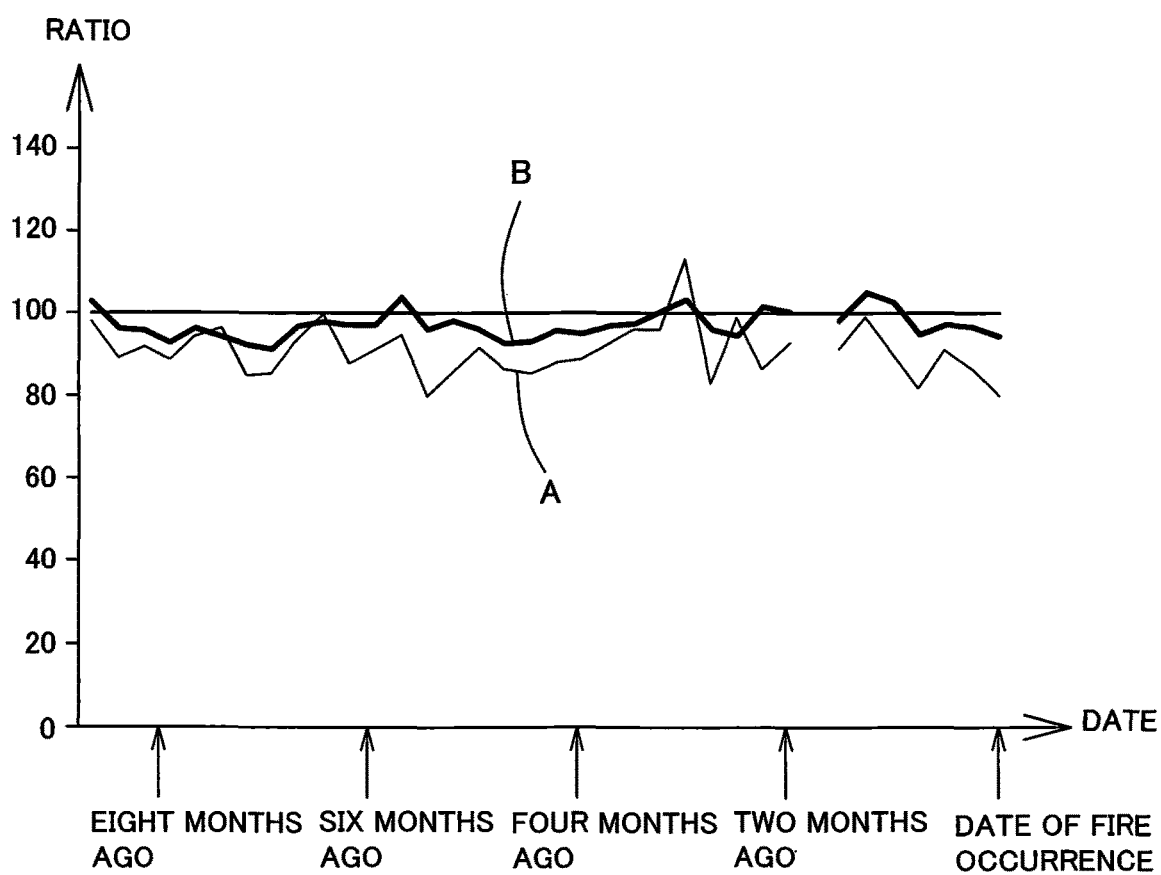
FIG. 9 is a graph used by the present inventor for consideration, and represents a ratio of a measured power generation amount to a theoretical power generation amount with respect to a date.

In the embodiments described above, when the arc information acquisition unit 24 detects the arc discharge in step S5 of FIG. 2, the process proceeds to step S9, and the abnormality determination unit 22 determines that there is an abnormality. However, the present invention is not limited thereto. As illustrated in FIG. 7, an abnormality may be determined by a divergence degree from an average of the summed values for each short time. Specifically, as illustrated in the flowchart of FIG. 7, when the arc discharge is detected in step S5 (No in step S5), the timer is reset to an initial state (step S40), and then the timer is turned on (step S41).

When a determination period T5 elapses after the timer is turned on (Yes in step S42) and the divergence degree of the division value at the end of the determination period T5 with respect to the average value of the division values for the reference period T2 exceeds a second threshold value (Yes in step S43), the process proceeds to step S9, and it is determined that there is an abnormality.

Here, the determination period T5 is a period shorter than the determination period T1 and equal to or longer than an interval of measurement of the power generation amount by the power generation amount measurement unit 25. The determination period T5 is preferably 2 hours or more and 3 days or less.

The second threshold value is preferably a value of −100% or more and −10% or less.

In addition, the divergence degree is expressed by the following formula (4).

[Mathematical formula 4]

$$\text{Divergence degree} = \frac{\text{Division value at the end of the determination period T5} - \text{Average value of the division values for the reference period T2}}{\text{average value of the division values for the reference period T2}} \times 100 \quad \text{Formula (4)}$$

In the embodiments described above, the slope is calculated by a ratio of a change in the division value at the time of the elapse of the determination period T1 to the average value of the division values for the past reference period T2, but the present invention is not limited thereto. The slope may be calculated by the regression line for the determination period T1. In other words, the slope may be calculated by calculating the division value for each predetermined time for the determination period T1 and calculating the regression line for the calculated division values.

In the embodiments described above, the solar radiation amount data acquisition unit 23 acquires the data of the solar radiation amount from the external organization 101 via the network 100, but the present invention is not limited thereto. Solar radiation amount measurement means such as a solar radiation meter may be connected, and the solar radiation amount in the installation place may be directly measured and used as the data of the solar radiation amount.

In the embodiments described above, in calculating the slope, the power generation amount per kW of the system capacity per day in which the summed value of the power generation amount per day is normalized by the system capacity is used, but the present invention is not limited thereto. The summed value of the power generation amount per day may be used for calculation of the slope without normalization.

In the embodiments described above, after the determination period T1 has elapsed, the calculation unit 20 calculates the average value of the division values for the past reference period T2 and calculates the slope of the division values for the determination period T1 with respect to the average value of the division values for the past reference period T2. However, the present invention is not limited thereto. The average value of the division values for the reference period T2 may be calculated by the calculation unit 20 or another device before the determination period T1 elapses. In other words, the average value of the division values for the reference period T2 may be a value calculated separately in advance before executing the abnormality determination operation of the abnormality determination unit 22 regardless of the abnormality determination operation.

In the embodiments described above, the power generation amount measurement unit 25 constantly measures the power generation amount, but the present invention is not limited thereto. The power generation amount measurement unit 25 may periodically and constantly measure the power generation amount.

In the embodiments described above, the abnormality determination device 3 is directly connected to the network 100, but the present invention is not limited thereto. The abnormality determination device 3 may be indirectly connected to the network 100 via a radio base station connectable to the network 100.

In the fifth embodiment described above, the comparison summed power generation amount for one day is calculated based on the JPEA method, but the present invention is not limited thereto. The comparison summed power generation amount for one day may be calculated by another method. For example, the comparison summed power generation amount for one day may be calculated according to JIS C 8907:2005.

In the embodiments described above, each component can be freely replaced or added between the embodiments as long as it is included in the technical scope of the present invention.

EXPLANATION OF REFERENCE CHARACTERS

1: power generation system
2: photovoltaic facility
3: abnormality determination device (abnormality determination system)
10: photovoltaic device
11: power conditioner
12: connection wiring line
20: calculation unit
21: data accumulation unit
22: abnormality determination unit
23: solar radiation amount data acquisition unit
24: arc information acquisition unit
25: power generation amount measurement unit
26: error detection unit
27: notification means
101, 102: external organization

The invention claimed is:

1. An abnormality determination system that is configured to be connected to a photovoltaic facility to determine an abnormality thereof, comprising:
a power generation amount measurement unit that measures a power generation amount of the photovoltaic facility;
a data acquisition unit that acquires data of a solar radiation amount;
a calculation unit that divides a first summed value by a second summed value to calculate a division value, the first summed value referring to a summed value of the power generation amount per day measured by the power generation amount measurement unit, the second summed value referring to a summed value of the solar radiation amount per day acquired by the data acquisition unit; and a data accumulation unit that accumulates a combination of the measured power generation amount and data of the solar radiation amount, or accumulates the division value, wherein the abnormality determination system determines that there is an abnormality in any of following cases (1) to (3):
(1) a case where an average value of the division values for a reference period is calculated in advance from division values calculated in the past, and a slope over time of the division values with respect to the average value of the division values for the reference period falls below a threshold value;
(2) a case where an average value of the division values for the reference period is calculated by the calculation unit, and a slope over time of the division values with respect to the average value of the division values for the reference period falls below a threshold value; and
(3) a case where a slope over time of a regression line of the division values for a determination period falls below a threshold value.

2. The abnormality determination system according to claim 1, wherein the abnormality determination system determines that there is an abnormality when the slope over time of the division values with respect to the average value of the division values for the reference period falls below a threshold value continuously or intermittently a plurality of times.

3. The abnormality determination system according to claim 1,
wherein the calculation unit calculates an average value of the division values for the determination period, and
wherein the abnormality determination system determines that there is an abnormality when a slope over time of an average value of the division values for the determination period with respect to the average value of the division values for the reference period falls below a threshold value.

4. The abnormality determination system according to claim 1, wherein the data of the solar radiation amount includes an inclined-plane solar radiation amount.

5. The abnormality determination system according to claim 1,
wherein the measured power generation amount per day is a power generation amount per 1 kW of a system capacity, and
wherein an absolute value of the threshold value is larger than an absolute value of a slope over time caused by aged deterioration of the photovoltaic facility calculated according to International Electrotechnical Commission (IEC) 60904-3.

6. The abnormality determination system according to claim 5, wherein the absolute value of the threshold value is 0.005 m$^2$/kW·day or more.

7. The abnormality determination system according to claim 1, wherein a notification that an abnormality has occurred is issued when the abnormality determination system has determined that there is an abnormality.

8. The abnormality determination system according to claim 1,
wherein the photovoltaic facility includes a photovoltaic device and a power conditioner that inverts power generated by the photovoltaic device into AC power having a predetermined frequency,
wherein the abnormality determination system includes an error detection unit that detects error information of the power conditioner, and
wherein an abnormality is determined using the error information.

9. The abnormality determination system according to claim 8, wherein the error information is classified into first error information related to a power generation amount and second error information not related to a power generation amount, and the threshold value is increased on condition that the error information is the first error information.

10. The abnormality determination system according to claim 8, comprising an arc information acquisition unit that acquires arc information related to an arc discharge in the photovoltaic device or between the photovoltaic device and the power conditioner,
wherein an abnormality is determined using the arc information.

11. A power generation system comprising the abnormality determination system according to claim 1; and the photovoltaic facility.

12. An abnormality determination system that is configured to be connected to a photovoltaic facility to determine an abnormality thereof, comprising:
a power generation amount measurement unit that measures a power generation amount of the photovoltaic facility;
a calculation unit that creates summed power generation amount data for one day in a predetermined period; and
a data accumulation unit that accumulates a combination of the power generation amount measured by the power generation amount measurement unit and time at which the measurement is made, or the summed power generation amount data for one day,
wherein the summed power generation amount data for one day is created by dividing one day into time zones having a predetermined time interval and extracting a maximum power generation amount of each time zone in the predetermined period to add up the extracted maximum power generation amounts, and
wherein the abnormality determination system determines that there is an abnormality when a slope over time of the summed power generation amount data for one day falls below a threshold value.

13. A power generation system comprising:
the abnormality determination system according to claim 12; and
the photovoltaic facility.

14. An abnormality determination system that is configured to be connected to a photovoltaic facility to determine an abnormality thereof, comprising:
a power generation amount measurement unit that measures a power generation amount of the photovoltaic facility;
a data acquisition unit that acquires data of a solar radiation amount;
a calculation unit that creates summed power generation amount data for one day and summed solar radiation amount data for one day in a predetermined period; and
a data accumulation unit that accumulates a combination of the power generation amount measured by the power generation amount measurement unit, time at which the measurement is made, and data of the solar radiation amount; or the summed power generation amount data for one day and the summed solar radiation amount data for one day, wherein the summed power generation amount data for one day is created by dividing one day into time zones having a predetermined time interval and extracting a maximum power generation amount of each time zone in the predetermined period to add up the extracted maximum power generation amounts, wherein the solar radiation amount data for one day is created by dividing one day into time zones having a predetermined time interval and extracting a maximum solar radiation amount in each time zone in the predetermined period to add up the extracted maximum solar radiation amounts, and wherein the abnormality determination system determines that there is an abnormality when a slope over time of division values falls below a threshold value, the division values being obtained by dividing the summed power generation amount data for one day by comparison summed power generation amount data for one day, the comparison summed power generation amount data for one day being calculated using the solar radiation amount data for one day.

15. A power generation system comprising:
the abnormality determination system according to claim 14; and
the photovoltaic facility.

* * * * *